US006447309B1

(12) United States Patent
Ko et al.

(10) Patent No.: US 6,447,309 B1
(45) Date of Patent: Sep. 10, 2002

(54) SUPPRESSING POWER BUS BOUNCING IN A HOT-SWAPPABLE SYSTEM

(75) Inventors: Han Y. Ko, Milpitas; Robert C. Cyphers, Fremont; Tomonori Hirai, Sunnyvale; Keith Y. Oka, Los Altos; Alan D. Martin, San Jose, all of CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/735,116

(22) Filed: Dec. 12, 2000

(51) Int. Cl.[7] .................................................. H02H 7/20

(52) U.S. Cl. ...................................................... 439/106

(58) Field of Search ................................ 439/106, 108, 439/924.1, 946, 947

(56) References Cited

U.S. PATENT DOCUMENTS 3,432,795 A * 3/1969 Jayne .......................... 439/60
3,612,985 A 10/1971 Rockett ..................... 324/28 R
4,118,690 A * 10/1978 Paynton .................. 439/106 X
5,144,520 A 9/1992 Parker et al. ............... 361/153
5,268,592 A * 12/1993 Bellamy et al. ..... 439/924.1 X
5,434,752 A 7/1995 Huth et al. ................. 361/798
5,584,030 A 12/1996 Husak et al. ............... 395/750
5,758,764 A 6/1998 Garoffolo et al. ........... 200/559
5,909,065 A * 6/1999 Jones et al. .......... 439/924.1 X
6,099,328 A * 8/2000 Nelson et al. .............. 439/101

* cited by examiner

*Primary Examiner*—Renee Luebke
(74) *Attorney, Agent, or Firm*—Rosenthal & Osha L.L.P.

(57) ABSTRACT

An apparatus for suppressing power bus bouncing in a hot-swappable system has been developed. The apparatus includes a connection module with three interior pins for: the power return; the power supply; and the system ground. The system ground pin is shorter than the other two so that it makes contact with the power bus after the bouncing from the return and supply pins has subsided.

13 Claims, 4 Drawing Sheets

SUPPRESSING POWER BUS BOUNCING IN A HOT-SWAPPABLE SYSTEM

BACKGROUND

Contact bounce is a common occurrence during the activation or deactivation of electrical contacts. These electrical contacts may include: push-button switches; toggle switches; electromechanical relays; or power connection devices. FIG. 1A shows a graph of a typical contact bounce in an electrical circuit. The graph represents a digital signal 10 that is switched from off (low) 12 to on (high) 18. When the electrical contact is activated 14, the signal goes through a contact bounce period 16 until it eventually stabilizes. FIG. 1B shows an alternative graph of a contact bounce where the electrical contact is switched from on (high) 22 to off (low) 28. As can be seen, a contact bounce period 26 occurs when the contact is de-activated 24 in a similar manner as shown in FIG. 1A.

For devices such as a lamp or electric motor, contact bounce is not usually a problem. The contact bounce periods 16 and 26 lasts a minute fraction of a second and will not affect the performance of the device. However, if the device being used is micro-processor, contact bounce can have a significant impact on performance since these devices perform operations in microseconds.

FIG. 2 shows a schematic of a prior art embodiment of a "hot-swap" controller circuit 30. "Hot-swapping" or "hot-plugging" refers to the insertion and removal of circuit boards into an active device, such as a computer motherboard, while the device is powered on. This circuit 30 is design to control inrush current so that an integrated circuit board can be safely inserted to and removed from a live backplane. In this embodiment, the controller circuit 30 represents the LT® 1640 Hotswap™ Controller produced by Linear Technology. Various pin connections for the chip are indicated by name in FIG. 2. The circuit 30 combines the controller chip 32 with additional components to provide control signals 33 to the system voltage converters (not shown). The power for the circuit 30 is provided by a power supply bus that includes: a 48 V line 34; a 48 V Return line 36; and a Board Engage (or Ground) line 38.

When the power supply bus is connected, the circuit may be susceptible to the problems of contact bounce. The contact bounce that results can cause an excess transient current and could potentially affect operation of the circuit 30. However, the controller circuit 30 includes a circuit breaker (not shown) that is internal to the controller chip 32. If the circuit 30 were to experience an excessive transient current, it would be transmitted from the GATE pin on the controller chip 32 through the output line 41 to the MOSFET 40. The MOSFET 40 would direct the majority of the excess current to the 48 V Return line 36. Additionally, a trace current would be transmitted back to the SENSE gate of the controller chip 32 via the trace current line 42. Upon receipt of a trace current, the circuit breaker within the controller chip 32 will go to a "Latch Off" state which disable the circuit 30.

SUMMARY OF INVENTION

In an alternative embodiment, the invention relates to a connection module for a hot-swappable system power supply bus comprising: a module body; a power return pin extending from the module body, the power return pin having a first length; a power supply pin extending from the module body, the power supply pin having a second length; and a system ground pin extending from the module body, the system ground pin having a third length, wherein the third length is less than the first length and the second length such that the system ground pin makes a connection with the hot-swappable system subsequent to insertion of the power return pin and the power supply pin.

In an alternative embodiment, the invention relates to a connection module for a hot-swappable system power supply bus comprising: means for connecting a power return source to the hot-swappable system; means for connecting a power supply source to the hot-swappable system; and means for connecting a ground source to the hot-swappable system such that the ground source is connected after a contact bounce period of the power supply source and a contact bounce period of the power return source.

In an alternative embodiment, the invention relates to a method for connecting a power connection module to a hot-swappable system comprising: creating an over-voltage condition in the hot-swappable system by connecting a power supply pin and a power return pin to a power supply bus; allowing a contact bounce period to elapse during the over-voltage condition; and connecting a system ground pin to the power supply bus after the contact bounce period has elapsed.

The advantages of the invention include, at least, a power connection module that prevents excessive transient current, due to contact bounce, from being detected, by creating an over-voltage condition that allows the contact bounce to terminate before the system ground is connected.

DETAILED DESCRIPTION

Figure 1A:
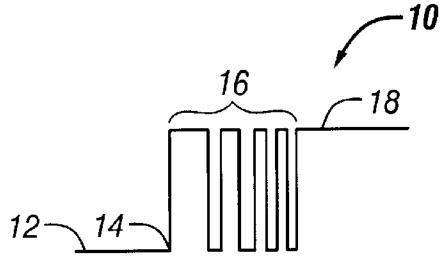
FIG. 1A (Prior Art)
FIG. 1A shows a graph of a typical contact bounce in an electrical circuit.
Figure 1B:
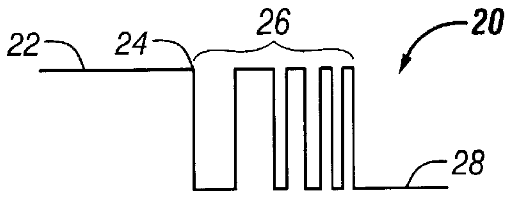
FIG. 1B (Prior Art)
FIG. 1B shows a graph of an alternative contact bounce in an electrical circuit.

Exemplary embodiments of the invention will be described with reference to the accompanying drawings. Like items in the drawings are shown with the same reference numbers.

Figure 2:
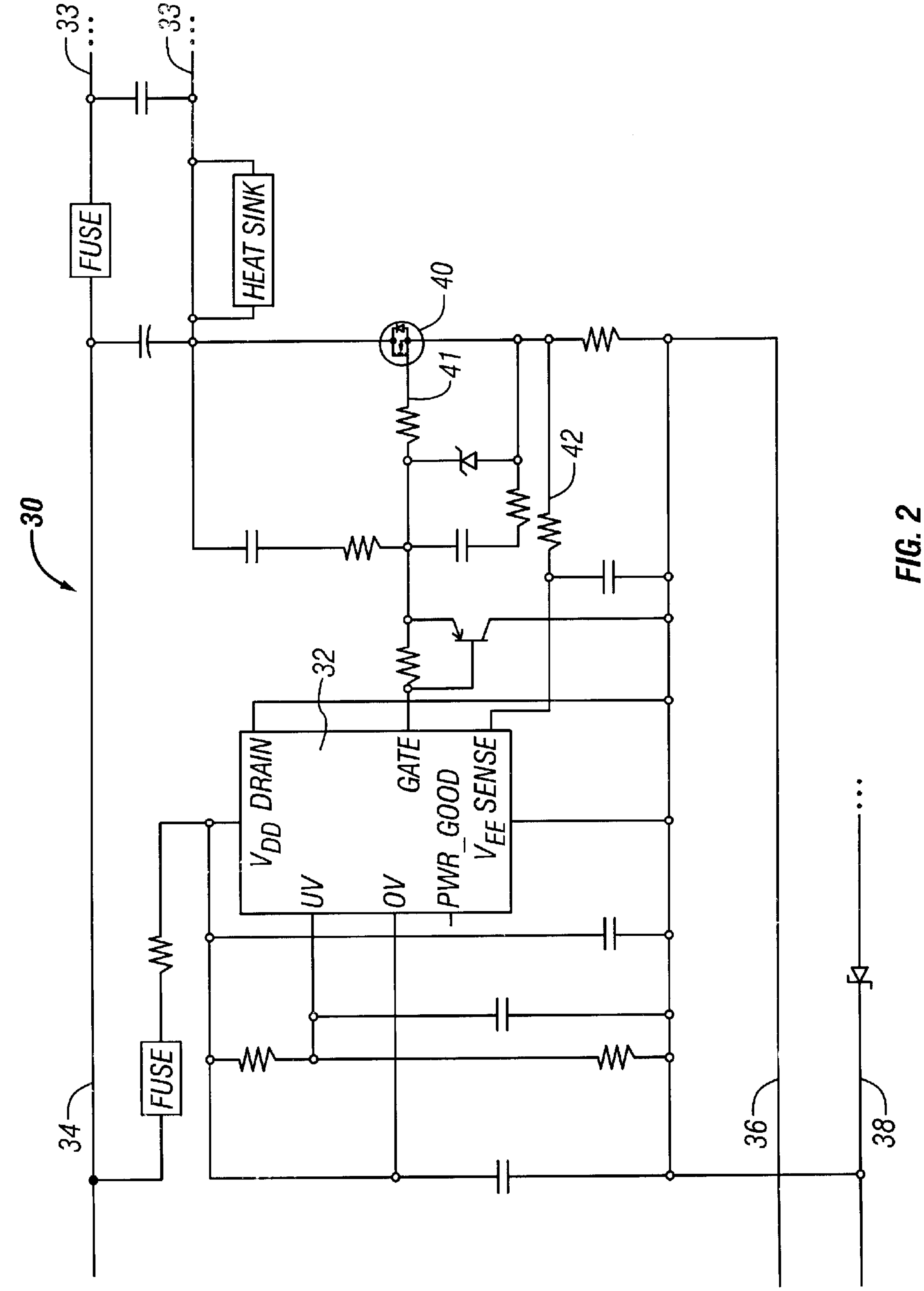
FIG. 2 (Prior Art)
FIG. 2 shows a schematic of a prior art embodiment of a hot-swap controller circuit.
Figure 3:
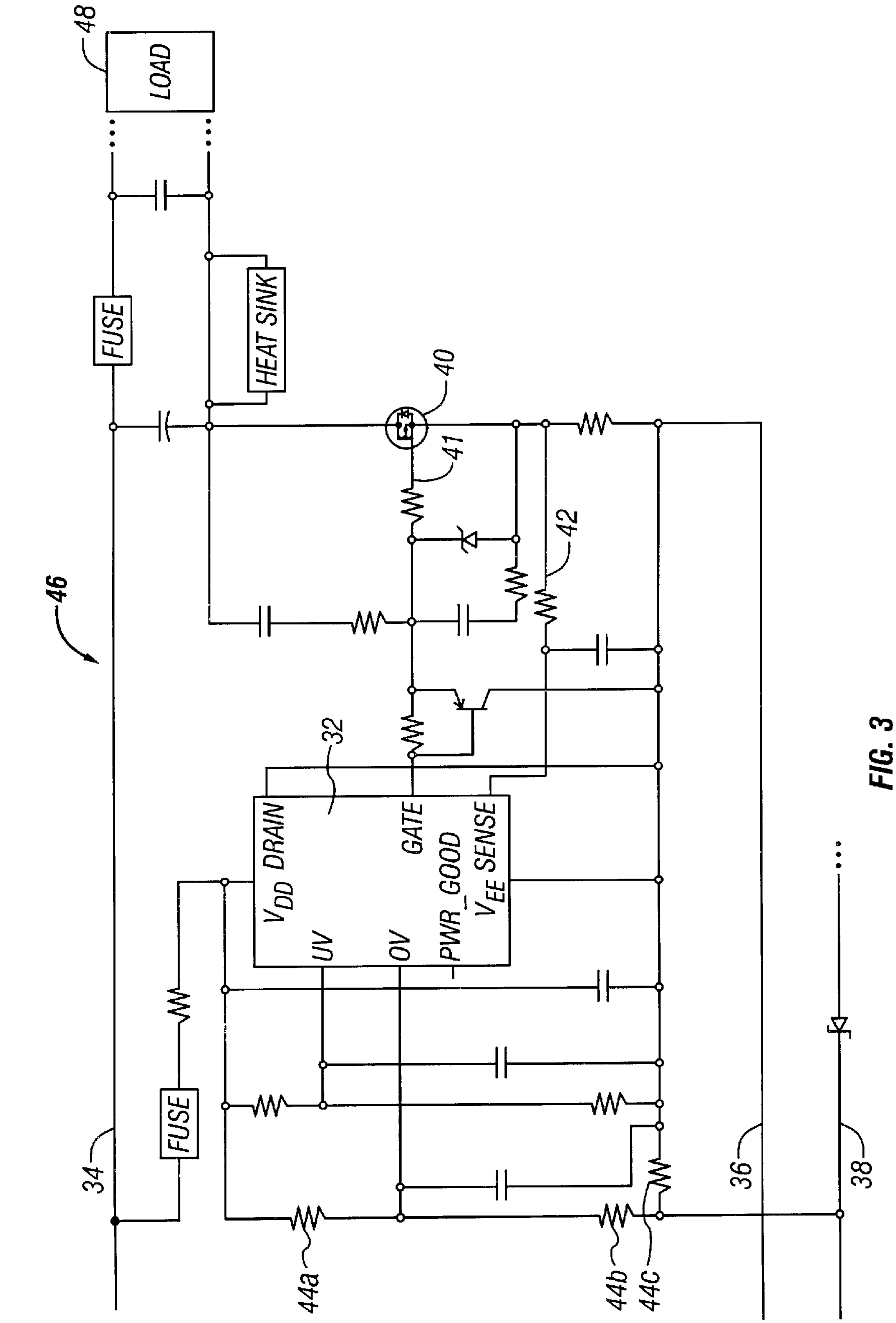
FIG. 3 shows a schematic of one embodiment of a hot swap controller circuit in accordance with the present invention.

FIG. 3 shows a schematic of one embodiment of the present invention of a hot swap controller circuit 46. The schematic of the circuit 46 shows a similar configuration to the controller circuit 30 shown in FIG. 2 with the exception of an additional voltage divider circuit. As in the previous figure, the controller chip 32 in this embodiment is the LT® 1640 Hotswap™ Controller produced by Linear Technology. In FIG. 3, the voltage divider circuit includes three separate resistors 44*a*, 44*b*, and 44*c*. In one embodiment, the resistors 44*a*, 44*b*, and 44*c* have the values of 301 kΩ, 4.7 kΩ, and 43.2 kΩ respectively. However, other values could be used in alternative embodiments in accordance with system parameters.

Figure 4B:
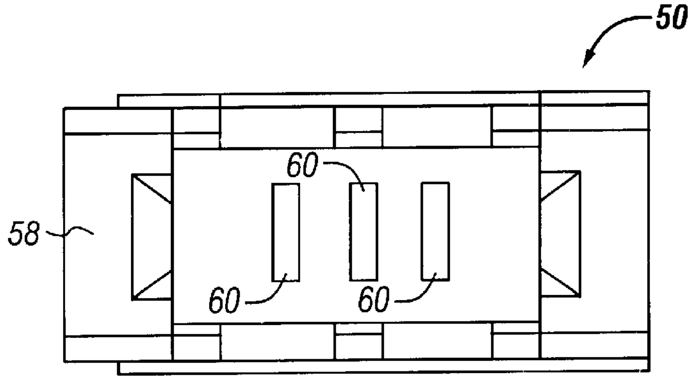
FIG. 4B shows a bottom view of one embodiment of a power module connector in accordance with the present invention.
Figure 4A:
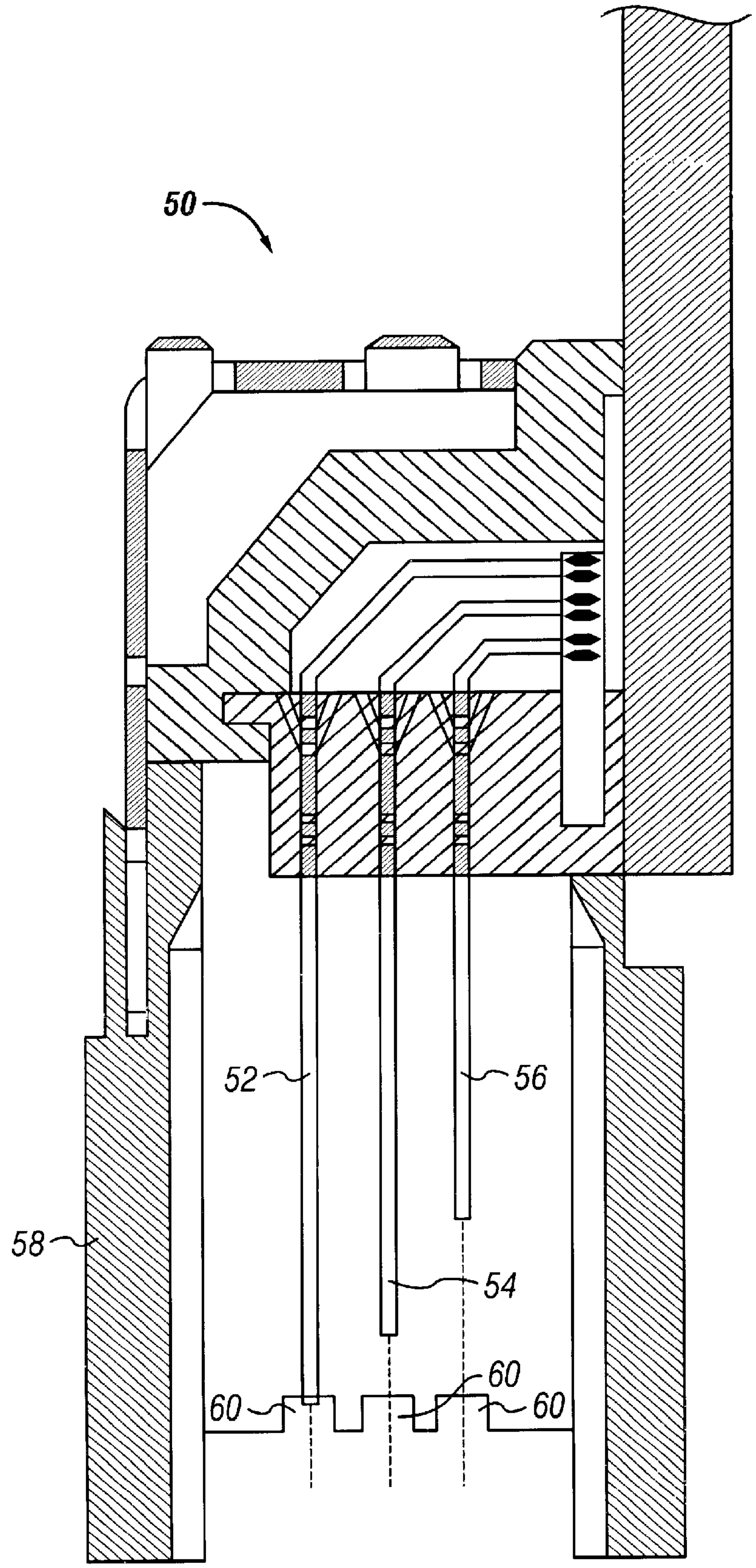
FIG. 4A shows a side cut-away view of one embodiment of a power module connector in accordance with the present invention.

FIG. 4A shows a side cut-away view of one embodiment of a power module connector 50 in accordance with the present invention. FIG. 4B shows a bottom view of the same connector 50. The connector includes a body 58 which houses three separate blades (or pins) 52, 54, and 56 which provide the actual connections for the power lines. In one embodiment, the longest blade 52 is the connection for the 48 V Power Return line 36 as shown in FIG. 3. The second longest blade 54 is the connection for the 48 V Power Supply line 34 also shown in FIG. 3. The shortest blade 56 is the connection for the Board Engage (or Ground) line 38 which is shown in FIG. 3 as well. In one embodiment, the actual lengths of the blades 52, 54, and 56 are 12 mm, 10.5 mm, and 4.75 mm from longest to shortest. The lengths may vary in alternative embodiments according to the specifications and characteristics of the system. As shown in FIG. 4B, each of the blades 52, 54, and 56 is enclosed within the body 58 of the connector 50. Contact with the blades 52, 54, and 56 is provided through a series of three slots 60 with one slot 60 for each blade 52, 54, and 56.

By utilizing a Board Engage blade 56 that is shorter in length than either the 48 V Return blade 52 or the 48 V Supply blade 54, an over-voltage condition is created until the shorter blade 56 makes stable (non-bouncing) contact with ground. The duration of over-voltage condition allows the multiple bounces to become settled by the differences in physical lengths of the blades. Specifically, the system power bus becomes stabilized from the effects of contact bounce by the time the shortest pin is engaged to the ground connector.

The over-voltage condition created by the initial connection with the longest two power blades can be potentially harmful to the circuit. However, it will not damage the circuit if the condition is recoverable (i.e., it diminishes over time). In the present embodiment, this is precisely what happens because once the shortest blade contacts system ground, the over-voltage condition will dissipate. Additionally, the voltage divider network with its three resistors 44*a*, 44*b*, and 44*c*, protects the load 48 to within its voltage design specifications. Finally, an over-voltage condition will result in shutting off the MOSFET 40 of the circuit 46, and as a result, no trace current will be detected by the controller chip 32 such that the internal circuit breaker will not "latch off".

While the disclosed embodiment shows a design for use with the LT® 1640 Hotswap™ Controller Circuit as shown in FIG. 3, it is fully contemplated that arrangement of the connection module as shown in FIG. 4A and 4B could be adapted for use with other circuits. This would most likely involve altering the dimensions of the connection blades and/or the arrangement of the voltage divider circuit, if one is necessary, to comply with the specifications of the circuit.

Figure 5:
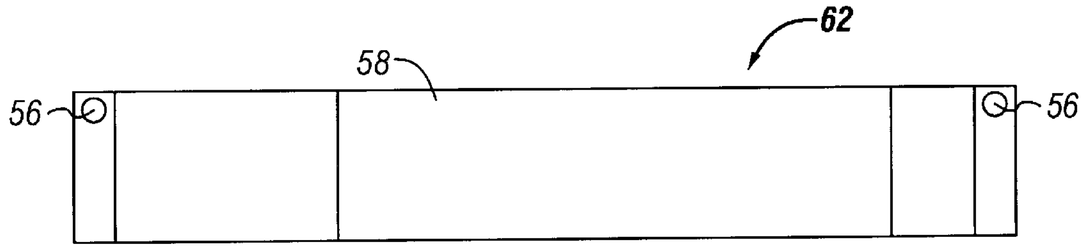
FIG. 5 shows an alternative embodiment of a connector with dual system ground pins.

One example of an alternative embodiment uses a connector 50 similar to the arrangement shown in FIG. 4A and 4B except that the connector only holds two blades internally. These blades would be the 48 V Power Return 52 and the Power Supply 54. The System Ground Pin 56 would be mounted externally from the body 58. Another example of an embodiment of a connector 62 is shown in FIG. 5. In this embodiment, the connector has dual System Ground Pins 56 which are located externally from the connector body 58.

The advantages of the disclosed invention includes at least the following: a power connection module that prevents excessive transient current due to contact bounce by creating an over-voltage condition that allows the contact bounce to be settled before the system ground is connected.

While the invention has been disclosed with reference to specific examples of embodiments, numerous variations and modifications are possible. Therefore, it is intended that the invention not be limited by the description in the specification, but rather the claims that follow.

What is claimed is:

1. A connection module for a hot-swappable system power supply bus comprising:

- a module body;
- a power return pin extending from the module body, the power return pin having a first length;
- a power supply pin extending from the module body, the power supply pin having a second length; and
- a system ground pin extending from the module body, the system ground pin having a third length, wherein the third length is less than the first length and the second length such that the system ground pin makes a connection with the hot-swappable system subsequent to insertion o the power return pin and the power supply pin,
- wherein the system ground pin makes a connection with the hot-swappable system after a contact bounce period of at least one of the power return pin and the power supply pin.

2. The connection module of claim 1, wherein the second length is less than the first length such that the power supply pin makes a connection with the hot-swappable system subsequent to insertion the power return pin.

3. The connection module of claim 1, wherein the body encloses each pin while access for connection to the hot-swappable system is provided by an open pin slot on the body.

4. The connection module of claim 1, wherein the first length is 12 mm.

5. The connection module of claim 1, wherein the second length is 10.5 mm.

6. The connection module of claim 1, wherein the third length is 4.75 mm.

7. A connection module for a hot-swappable controller system power supply bus comprising:

- an enclosed module body with three access slots;
- a 48 volt power return pin within the module body so that a connection can be made with the power return pin through one of the access slots, the power return pin having a length of 12 mm;
- a 48 volt power supply pin within the module body so that a connection can be made with the power supply pin through one of the access slots, the power supply pin having a length of 10.5 mm; and
- a system ground pin within the module body so that a connection can be made with the system ground pin through one of the access slots, the system ground pin having a length of 4.75 mm.

8. A connection module for a hot-swappable system power supply bus comprising:

- means for connecting a power return source to the hot-swappable system;
- means for connecting a power supply source to the hot-swappable system; and
- means for connecting a ground source to the hot-swappable system such that the ground source is connected after a contact bounce period of the power return source and a contact bounce period of the power supply source.

9. A method for connecting a power connection module to a hot-swappable system comprising:

creating an over-voltage condition in the hot-swappable system by connecting a power return pin and a power supply pin to a power supply bus;

allowing a contact bounce period to elapse during the over-voltage condition; and connecting a system ground pin to the power supply bus after the contact bounce period has elapsed.

10. The method of claim 9, wherein the power return pin is connected to the power supply bus before the power supply pin is connected to the power supply bus.

11. The method of claim 10, wherein the system ground pin has a shorter length than the power supply pin.

12. The method of claim 11, wherein the power supply pin has a shorter length than the power return pin.

13. A method for connecting a power connection module to a hot-swappable control system comprising:

creating an over-voltage condition in the hot-swappable control system by connecting a 12 mm power return pin and a 10.5 mm power supply pin to a power supply bus;

allowing a contact bounce period to elapse during the over-voltage condition; and connecting a 4.75 mm system ground pin to the power supply bus after the contact bounce period has elapsed, wherein the connected system ground pin dissipates the over-voltage condition.

* * * * *